(12) United States Patent
Artin

(10) Patent No.: US 11,053,717 B2
(45) Date of Patent: Jul. 6, 2021

(54) HOLD OPEN ROD ASSEMBLY

(71) Applicant: HARTWELL CORPORATION, Placentia, CA (US)

(72) Inventor: Bo D. Artin, Placentia, CA (US)

(73) Assignee: Hartwell Corporation, Placentia, CA (US)

( * ) Notice: Subject to any disclaimer, the term of this patent is extended or adjusted under 35 U.S.C. 154(b) by 549 days.

(21) Appl. No.: 15/889,596

(22) Filed: Feb. 6, 2018

(65) Prior Publication Data

US 2018/0223572 A1 Aug. 9, 2018

Related U.S. Application Data

(60) Provisional application No. 62/455,433, filed on Feb. 6, 2017.

(51) Int. Cl.
| | |
|---|---|
| *E05C 17/30* | (2006.01) |
| *B64D 29/08* | (2006.01) |
| *E05C 17/08* | (2006.01) |
| *B64D 29/06* | (2006.01) |

(52) U.S. Cl.
CPC .............. *E05C 17/30* (2013.01); *B64D 29/06* (2013.01); *B64D 29/08* (2013.01); *E05C 17/08* (2013.01); *Y10T 292/14* (2015.04); *Y10T 292/28* (2015.04)

(58) Field of Classification Search
CPC ........ E05C 17/08; E05C 17/30; Y10T 292/14; Y10T 292/28; Y10T 292/282; Y10T 292/304; B64D 29/08
See application file for complete search history.

(56) References Cited

U.S. PATENT DOCUMENTS

| | | | |
|---|---|---|---|
| 59,601 A | 1/1898 | Blaser | |
| 1,273,059 A | 7/1918 | Hild | |
| 3,107,933 A | * 10/1963 | Royster | ................. F15B 15/261 |
| | | | 403/180 |
| 3,180,234 A | 4/1965 | Raymond | |
| 3,469,871 A | 9/1969 | Betts | |
| 3,583,288 A | 6/1971 | Nepp | |
| 3,584,544 A | 6/1971 | Haberman | |
| 3,945,744 A | 3/1976 | Metz | |
| 3,990,542 A | 11/1976 | Dent et al. | |
| 4,323,356 A | 4/1982 | Stephenson | |
| 4,342,135 A | 8/1982 | Matsuo et al. | |

(Continued)

FOREIGN PATENT DOCUMENTS

| | | |
|---|---|---|
| CA | 1129620 | 8/1982 |
| CN | 2159488 | 3/1994 |

(Continued)

OTHER PUBLICATIONS

Merriam-Webster's Dictionary Definition of the word "pin," https://www.merriam-webster.com/dictionalry/pin (2019).

(Continued)

*Primary Examiner* — Carlos Lugo
(74) *Attorney, Agent, or Firm* — Barnes & Thornburg LLP

(57) ABSTRACT

A hold open rod assembly includes an outer tubular structure and an inner tubular structure positioned for telescoping movement relative to the outer tubular structure. A locking mechanism retains the hold open rod assembly in an extended state to support a panel of an aircraft in an open position at the selection of a user.

21 Claims, 9 Drawing Sheets

(56) References Cited

U.S. PATENT DOCUMENTS

| | | |
|---|---|---|
| 4,503,952 A | 3/1985 | Hesse |
| 4,614,004 A | 9/1986 | Oshida |
| 4,700,822 A | 10/1987 | Maucher et al. |
| 4,946,131 A | 8/1990 | Weyand |
| 5,004,215 A | 4/1991 | Aubry et al. |
| 5,265,970 A | 11/1993 | LaBarre |
| 5,301,775 A | 4/1994 | Nedbal et al. |
| 5,323,884 A | 6/1994 | Machino |
| 5,366,313 A | 11/1994 | LaBarre |
| 5,407,325 A | 4/1995 | Aubry |
| 5,417,511 A | 5/1995 | Warden |
| 5,862,896 A | 1/1999 | Villbrandt et al. |
| 5,896,959 A | 4/1999 | Jeffries et al. |
| 5,950,997 A | 9/1999 | Metz |
| 6,193,223 B1 | 2/2001 | Jackson |
| 6,334,730 B1 | 1/2002 | Porte |
| 6,796,529 B1 | 9/2004 | Duran et al. |
| 7,654,371 B1 | 2/2010 | Metz et al. |
| 7,882,941 B2 | 2/2011 | Rozema |
| 8,147,358 B2 | 4/2012 | Chen |
| 8,615,846 B2* | 12/2013 | Wheeler .............. E05C 17/30 16/82 |
| 10,670,063 B2* | 6/2020 | Artin .............. E05C 17/30 |
| 2007/0045068 A1 | 3/2007 | Namuduri et al. |
| 2009/0324327 A1 | 12/2009 | McAndrews |
| 2010/0024161 A1 | 2/2010 | Wood et al. |
| 2010/0307872 A1 | 12/2010 | Wheeler et al. |
| 2013/0146736 A1 | 6/2013 | Wheeler et al. |
| 2013/0175419 A1 | 7/2013 | Wheeler et al. |
| 2013/0206955 A1 | 8/2013 | Palma et al. |
| 2015/0267724 A1 | 9/2015 | Dyer et al. |
| 2015/0284978 A1 | 10/2015 | Artin |
| 2016/0069118 A1 | 3/2016 | Artin |

FOREIGN PATENT DOCUMENTS

| | | |
|---|---|---|
| CN | 101346576 | 1/2009 |
| FR | 2771459 | 5/1999 |
| WO | 2014/071270 | 5/2014 |

OTHER PUBLICATIONS

Search Report and Written Opinion issued in App. No. PCT/US2018/017007 (201*).

* cited by examiner

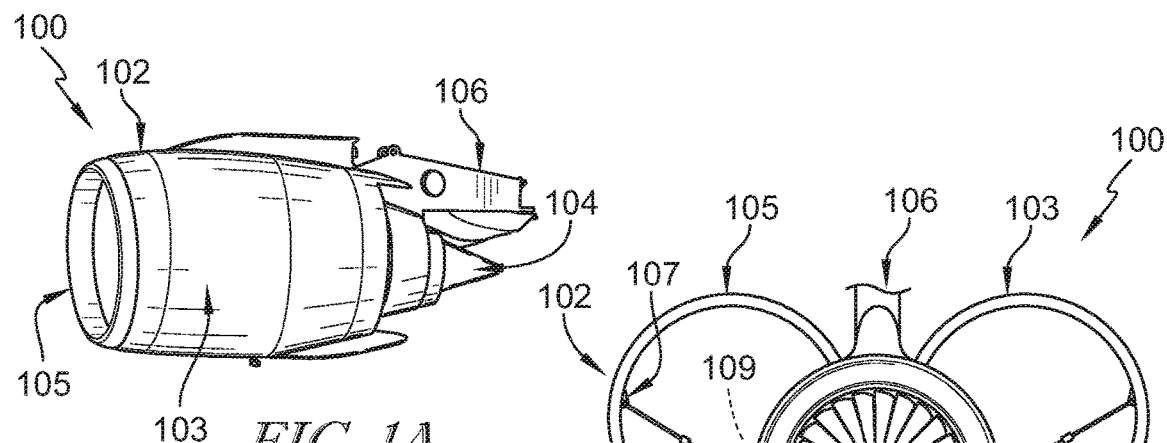
FIG. 1A
FIG. 1B
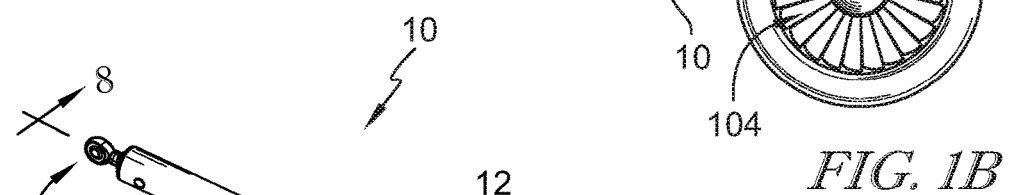
FIG. 2A
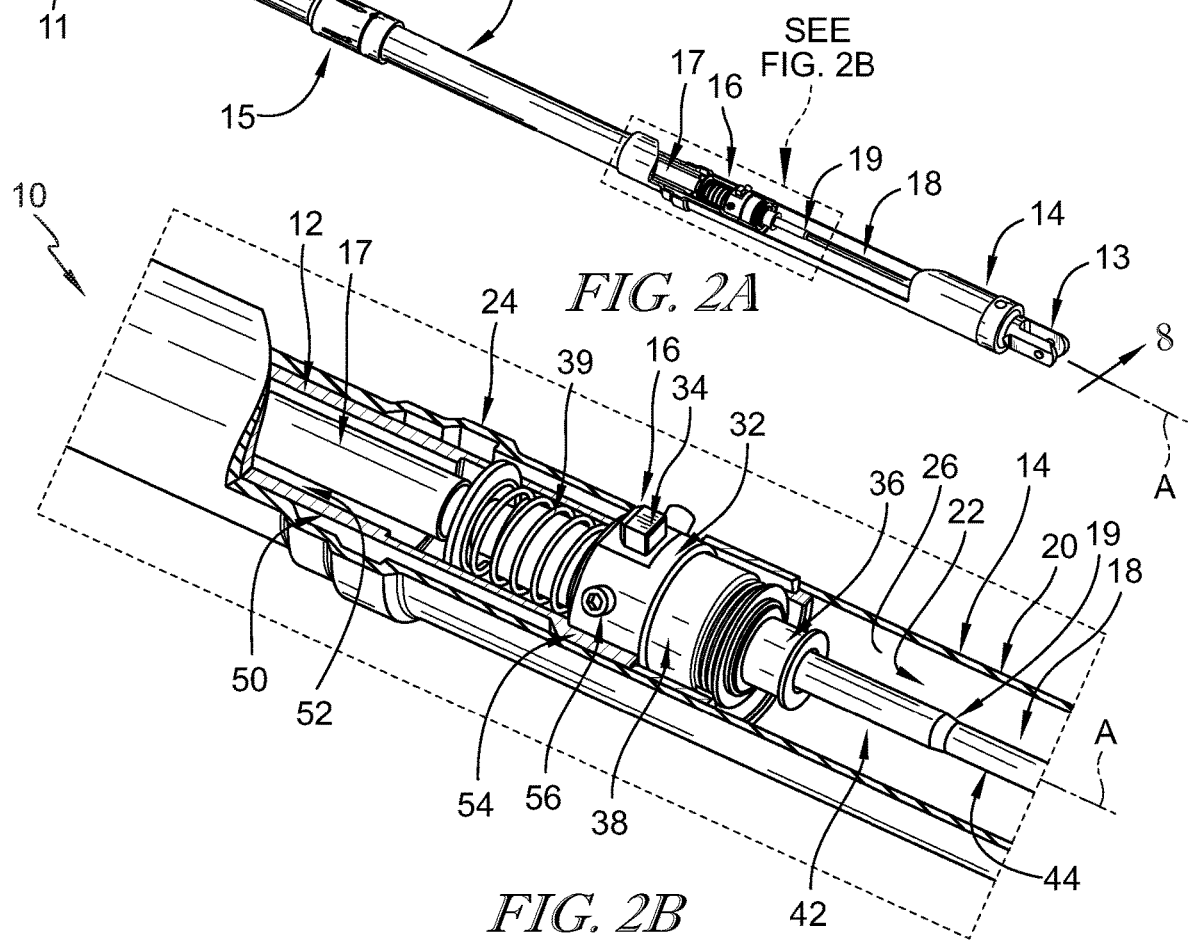
FIG. 2B

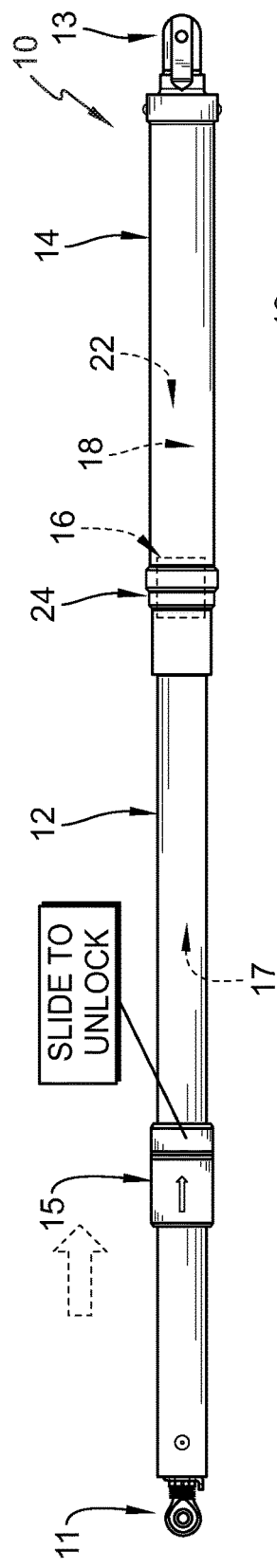
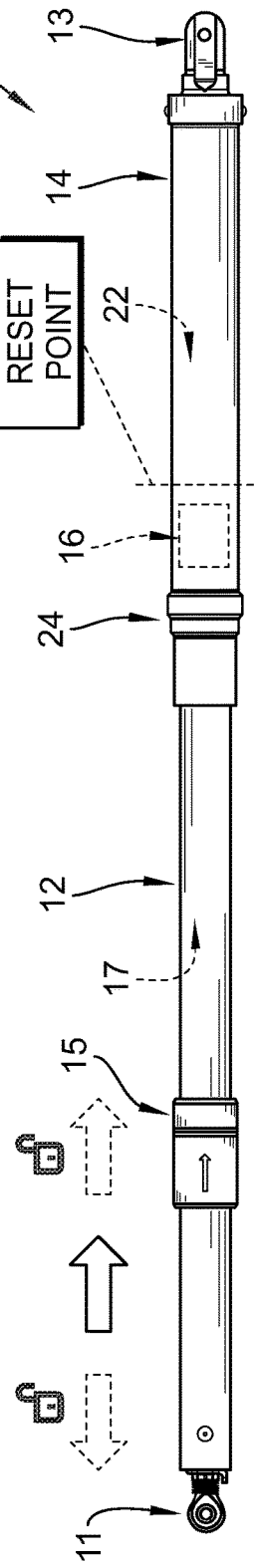
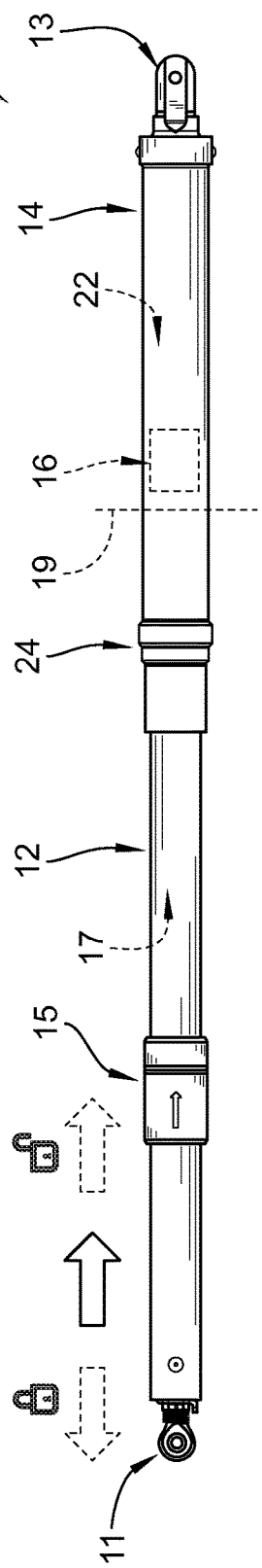
FIG. 3A
FIG. 3B
FIG. 3C

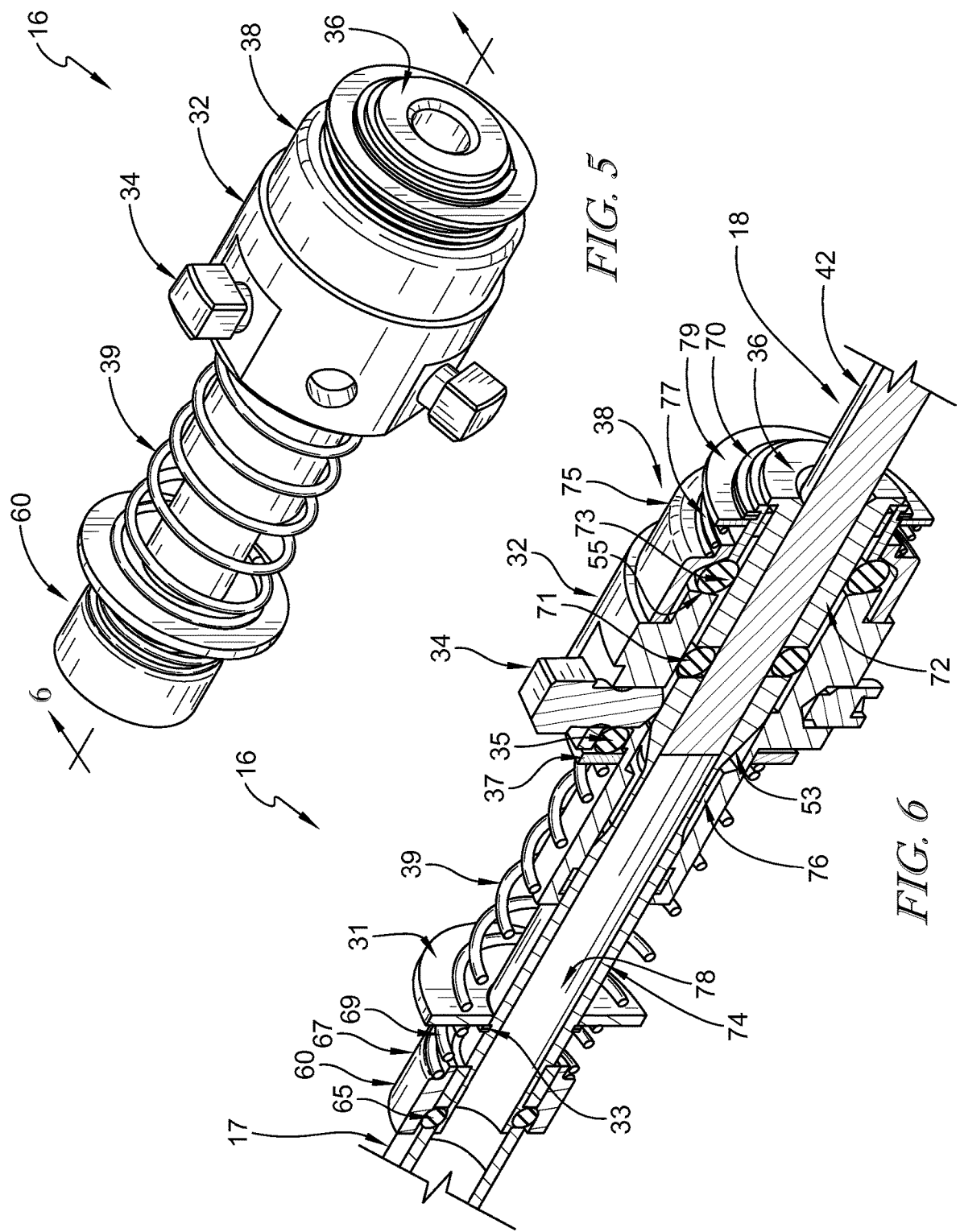

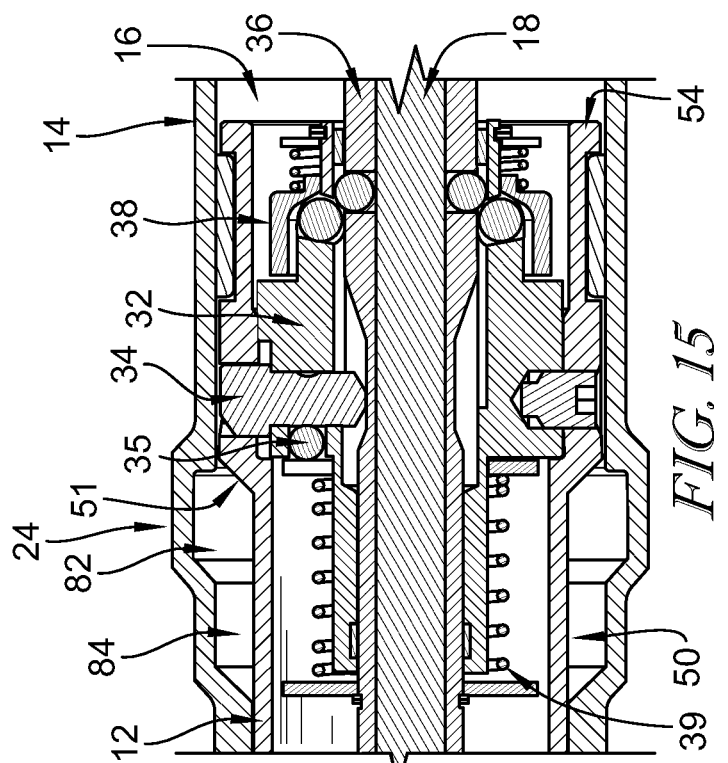
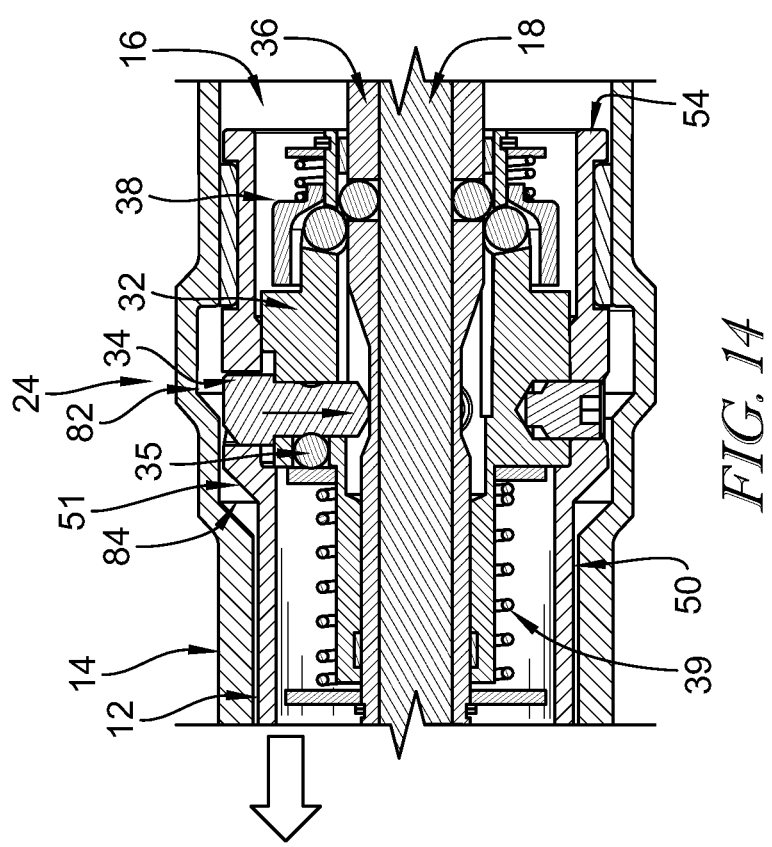
FIG. 14
FIG. 15

HOLD OPEN ROD ASSEMBLY

CROSS-REFERENCE TO RELATED APPLICATION

This application claims benefit under 35 U.S.C. § 119 of U.S. Provisional Patent Application No. 62/455,433, filed on Feb. 6, 2017, and incorporates by reference the disclosure thereof in its entirety.

BACKGROUND

Many aircraft include one or more panels which are used to cover an opening of the aircraft. The opening may be covering a door panel, an engine component, or an engine housing often referred to as nacelle or fan cowl. Such structures can be used in a variety of settings in addition to cowls on aircraft.

One of the problems with a cowl is that it may be required to be retained in an open position to allow an aircraft mechanic or other operator to have access to the area underneath the cowl. For example, an aircraft mechanic or other party may need to repair the aircraft of observe the condition of the structures or components underneath the cowl covering. When the cowl is displaced from the remainder of the structure it needs to be retained in an open position. The cowl also needs to be easily closable allowing the operator to disengage any locking mechanisms on the cowl generally easily and efficiently.

One situation that occurs with a cowl is that it may need to accommodate both compressive and tensile loads. A compressive load may occur as a result of the weight of the cowl resting on the extended rod such that the length of the rod carries the weight from a first connecting point at the cowl to a second connecting point on another portion of the aircraft structure. The cowl may need to carry tensile loads when positioned in a different position or when experiencing a wind load. Under these conditions, the rod will need to maintain its locked condition.

This background information is merely provided for context, and no admission is intended, nor should such admission be inferred or construed, that any of the preceding information constitutes prior art to the present disclosure.

SUMMARY

According to the present disclosure, a hold open rod assembly includes a locking mechanism to allow a single operator to control the locking mechanism and to sustain a compressive load while the assembly is unlocked. In illustrative embodiments, the hold open rod assembly is used on a fan cowl of an aircraft. In illustrative embodiments, the hold open rod assembly includes a locking mechanism which is mounted on an inner tube of a telescopic tubular strut structure including the inner tube and an outer tube. The locking mechanism allows the tubular strut structure to be unlocked while sustaining compressive loads when the system is unlocked. In illustrative embodiments, the locking mechanism resets during extension and/or retraction of the telescopic rod components.

BRIEF DESCRIPTION OF THE DRAWINGS

The present disclosure will be described hereafter with reference to the attached drawings which are given as a non-limiting example only, in which:

FIG. 1A is a perspective view of an aircraft engine assembly including a nacelle or fan cowl surrounding a gas turbine engine supported on the aircraft by an engine-mounting bracket and suggesting that the fan cowl include a left-side panel and a right-side panel;

FIG. 1B is a front elevation view of the engine assembly of FIG. 1A showing the left-side and right-side panels of the fan cowl extended away from the gas turbine engine in an open position and suggesting that hold open rod assemblies in accordance with the present disclosure are positioned to support the panels in the open position;

FIG. 2A is a perspective view of one of the hold open rod assemblies of FIG. 1B showing that the hold open rod assembly includes a locking mechanism coupled to an inner tube arranged for telescoping movement relative to an outer tube and a control shaft coupled to the outer tube and suggesting that the control shaft engages with the locking mechanism to control movement of the locking mechanism between a loaded configuration for locking the hold open rod assembly in an extended position and an unloaded configuration to allow movement of the hold open rod assembly to a retracted position;

FIG. 2B is an enlarged view of the hold open rod assembly of FIG. 2A showing that the locking mechanism includes a plurality of lock pins and a plunger for controlling movement of the lock pins and that the control shaft includes sections having different diameters defining a reset point at a transition between the sections for releasing a plunger-motion controller of the locking mechanism to reset the locking mechanism to the loaded configuration and bias the lock pins toward an engagement position as suggested in FIGS. 3A-3C;

FIG. 3A is a side elevation view of the hold open rod assembly of FIG. 2A showing the hold open rod assembly in a fully extended position corresponding to the open position of the panels of the fan cowl and suggesting that a lock-release sleeve is coupled to the plunger of the locking mechanism for moving of the locking mechanism to the unloaded configuration at the selection of a user to allow movement of the hold open rod assembly toward a retracted position as suggested in FIGS. 3B and 3C;

FIG. 3B is a view similar to FIG. 3A showing the hold open rod assembly partially retracted in a free travel position and suggesting that the locking mechanism is maintained in the unloaded configuration before the locking mechanism has passed the reset point of the control shaft to allow the hold open rod assembly to extend or retract at the selection of a user;

FIG. 3C is a view similar to FIG. 3B showing the hold open rod assembly moved further toward a fully retracted position corresponding to a closed position of the panels of the fan cowl and suggesting that the locking mechanism is reset to the loaded configuration after passing the reset point of the control shaft such that the hold open rod assembly can be locked in the fully extended position at the selection of a user;

FIG. 5 is a perspective view of the locking mechanism of FIG. 4 showing the lock pins extended to the engagement position and suggesting that a main spring biases the plunger toward a hold position to block inward movement of the lock pins;

FIG. 6 is a perspective sectional view taken along line 6-6 in FIG. 5 showing the control shaft received in the locking mechanism to engage with the plunger-motion controller and that a pole coupler engages with an end of the plunger and an end of the pole to hold the pole on the plunger;

FIGS. 14-15 are views similar to FIGS. 10-13 illustrating movement of the inner tube relative to the outer tube to force the lock pins inward and allow the hold open rod assembly to move toward the retracted position as part of the unlocking process.

Figure 4:
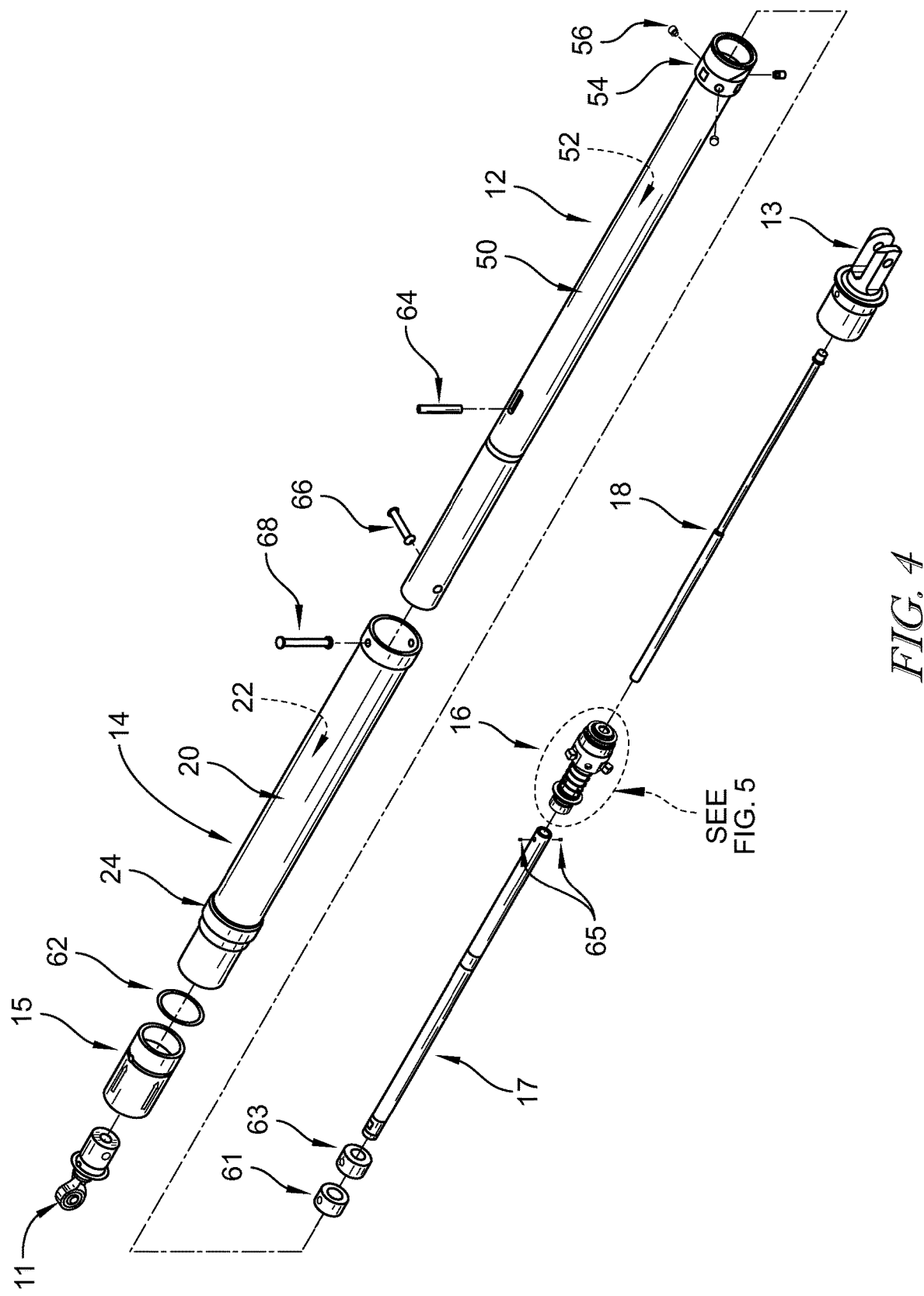
FIG. 4 is an exploded assembly view of the hold open rod assembly of FIG. 2A showing that the inner tube is received through the outer tube and that a connecting pole is coupled to the locking mechanism and extends into the inner tube to couple with the lock-release sleeve.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

An engine assembly 100 for attachment with an aircraft is shown in FIG. 1A. Engine assembly 100 includes a nacelle or fan cowl 102 positioned to surround a gas turbine engine 104 supported by an engine-mounting bracket 106 for securing engine assembly 100 to the aircraft. Fan cowl 102 includes a right-side panel 103 and a left-side panel 105 which are movable relative to engine 104 between a closed position, shown in FIG. 1A, and an open position, shown in FIG. 1B. One or more hold open rod assemblies 10 in accordance with the present disclosure are movable between extended and retracted positions to control movement of right-side and left-side panels 103, 105 between the opened and closed positions. Each hold open rod assembly 10 is coupled between an outer rod mount 107 of panels 103, 105 and an inner rod mount 109. Inner rod mount 109 is illustratively coupled to another portion of fan cowl 102, but may be part of engine 104 in some embodiments.

An illustrative hold open rod assembly 10 in accordance with the present disclosure is shown in FIG. 2A. Hold open rod assembly 10 includes an inner tube 12, an outer tube 14, and a locking mechanism 16 arranged along an axis A as shown in FIG. 2A. Inner tube 12 extends into outer tube 14 and is configured to move relative to outer tube 14 telescopically. In the illustrative embodiment, locking mechanism 16 is coupled to inner tube 12 to move within outer tube 14 as inner tube 12 moves relative to outer tube 14. Locking mechanism 16 is configured to move between a locked position and an unlocked position to control movement of inner tube 12 relative to outer tube 14 at the selection of a user. A lock-release sleeve 15 (by way of a pole 17) engages with locking mechanism 16 for movement to the unlocked position at the selection of a user as suggested in FIGS. 8-15. A control shaft 18 engages with locking mechanism 16 to control movement from the unlocked position to the locked position, as suggested in FIGS. 16-19, and a reset point 19 where locking mechanism 16 is reset and allowed to move toward the locked position is adjustable along a length of travel of inner tube 12 toward the retracted position of hold open rod assembly 10 as suggested in FIGS. 3A-3C. Connection assemblies 11, 13 positioned at opposing ends of tubes 12, 14 allow attachment of hold open rod assembly 10 with rod mounts 107, 109 of engine assembly 100.

Outer tube 14 includes a tube body 20 defining an internal cavity 22 and a catch 24 coupled at an end of tube body 20 as shown in FIG. 2B. Inner tube 12 and locking mechanism 16 move within cavity 22. Locking mechanism 16 includes a cartridge body 32, lock pins 34, and a plunger 36. Cartridge body 32 is coupled to inner tube 12. Lock pins 34 are at least partially received in cartridge body 32 and movable radially outward and inward relative to cartridge body 32 to control movement of inner tube 12 relative to outer tube 14. Plunger 36 extends at least partially into cartridge body 32 and axially movable relative to cartridge body 32 to control movement of lock pins 34.

Lock pins 34 are movable between an engagement position to engage with catch 24 and block movement of inner tube 12 relative to outer tube 14 and a travel position radially inward of an inner surface 26 of outer tube 14 to allow movement of inner tube 12 relative to outer tube 14 as suggested in FIG. 2B. Plunger 36 is movable between a hold position where plunger 36 blocks radially inward movement of lock pins 34 from the engagement position and a release position where plunger 36 allows lock pins 34 to move radially inward to the travel position. A plunger-motion controller 38 is coupled to cartridge body 32 and configured to control movement of plunger 36 between the hold and release positions. A main spring 39 biases plunger 36 toward the hold position to bias lock pins 34 toward the engagement position so that locking mechanism 16 is moved to the locked position upon full extension of hold open rod assembly 10.

Lock-release sleeve 15 and pole 17 move plunger 36 to the release position and allow locking mechanism to move to the unlocked position at the selection of a user as suggested in FIGS. 2A and 2B. Plunger-motion controller 38 blocks plunger 36 from moving to the hold position until locking mechanism 16 is reset as hold open rod assembly 10 moves toward the retracted position. Control shaft 18 includes sections 42, 44 having different diameters, and reset point 19 is defined at a transition between sections 42, 44 as shown in FIG. 2B. Section 42 engages with plunger-motion controller 38 to block movement of plunger 36 toward the hold position. Movement of plunger-motion controller 38 beyond reset point 19 allows portions of plunger-motion controller 38 to move radially inward toward section 44 and allow plunger 36 to move toward the hold position.

In the illustrative embodiment, a user moves lock-release sleeve 15 to unlock locking mechanism 16 and allow movement of hold open rod assembly 10 toward the retracted position as suggested in FIG. 3A. Locking mechanism 16 is maintained in the unlocked position before passing reset point 19 such that movement toward the extended position does not engage locking mechanism 16 with outer tube 14 for maintaining hold open rod assembly 10 in the extended position as suggested in FIG. 3B. Movement beyond reset point 19 resets locking mechanism 16 to allow locking mechanism 16 to move to the locked position upon extension of the hold open rod assembly 10 as suggested in FIG. 3C. A position of reset point 19 is adjustable. For example, control shaft 18 can be exchanged for another control shaft defining a different reset point.

Inner tube 12 includes a tube body 50 defining an internal cavity 52 and a receiver 54 coupled at an end of tube body 50 as shown in FIG. 2B. Cartridge body 32 of locking mechanism 16 is coupled to receiver 54 for movement of locking mechanism 16 with inner tube 12. In the illustrative embodiment, fasteners 56 (such as set screws) extend through receiver 54 and into cartridge body 32 to block axial and rotational movement of cartridge body 32 relative to inner tube 12. Lock pins 34 extend through receiver 54 to engage with outer tube 14. Pole 17 engages with plunger 36 and extends into cavity 52 to couple with lock-release sleeve 15 positioned over inner tube 12.

Inner tube 12 is received in outer tube 14 as suggested in FIG. 4. Receiver 54 of inner tube 12 is sized to move within cavity 22 of outer tube 14 and engage with catch 24 to block inner tube 12 from passing completely through outer tube 14. A fastener 66 (such as a rivet) couples inner tube 12 with connection assembly 11. Pole 17 is received in cavity 52 of inner tube 12 and coupled with lock-release sleeve 15 with a pin 64. A lock ring 62 holds pin 64 in place relative to lock-release sleeve 15. Braces 61, 63 support pole 17 within cavity 52 of inner tube 12. In the illustrative embodiment, locking mechanism 16 engages with pole 17 using a pole coupler 60 as suggested in FIGS. 4-6. Locking mechanism 16 is coupled to receiver 54 using fasteners 56 as shown in FIG. 4. Control shaft 18 is coupled to connection assembly 13 for movement with outer tube 14. Connection assembly 13 is coupled to outer tube 14 with a fastener 68 (such as a rivet).

Plunger 36 extends into cartridge body 32 to engage with lock pins 34 as suggested in FIGS. 5 and 6. Pole coupler 60 engages with a trailing end 74 of plunger 36 as shown in FIG. 6. Pole coupler 60 includes one or more ball bearings 65 (two are shown in FIG. 6) and a sleeve 67 configured to trap ball bearings 65 relative to plunger 36 and pole 17. A spring 69 biases sleeve 67 toward pole 17.

Main spring 39 biases plunger 36 toward the hold position as suggested in FIG. 6. A washer 31 (or other annular body) is coupled to trailing end 74 of plunger 36 using a lock ring 33. Main spring 39 extends between washer 31 and a washer 37 (or other annular body) to bias ball bearings 35 toward lock pins 34 as suggested in FIGS. 6 and 7.

Figure 7:
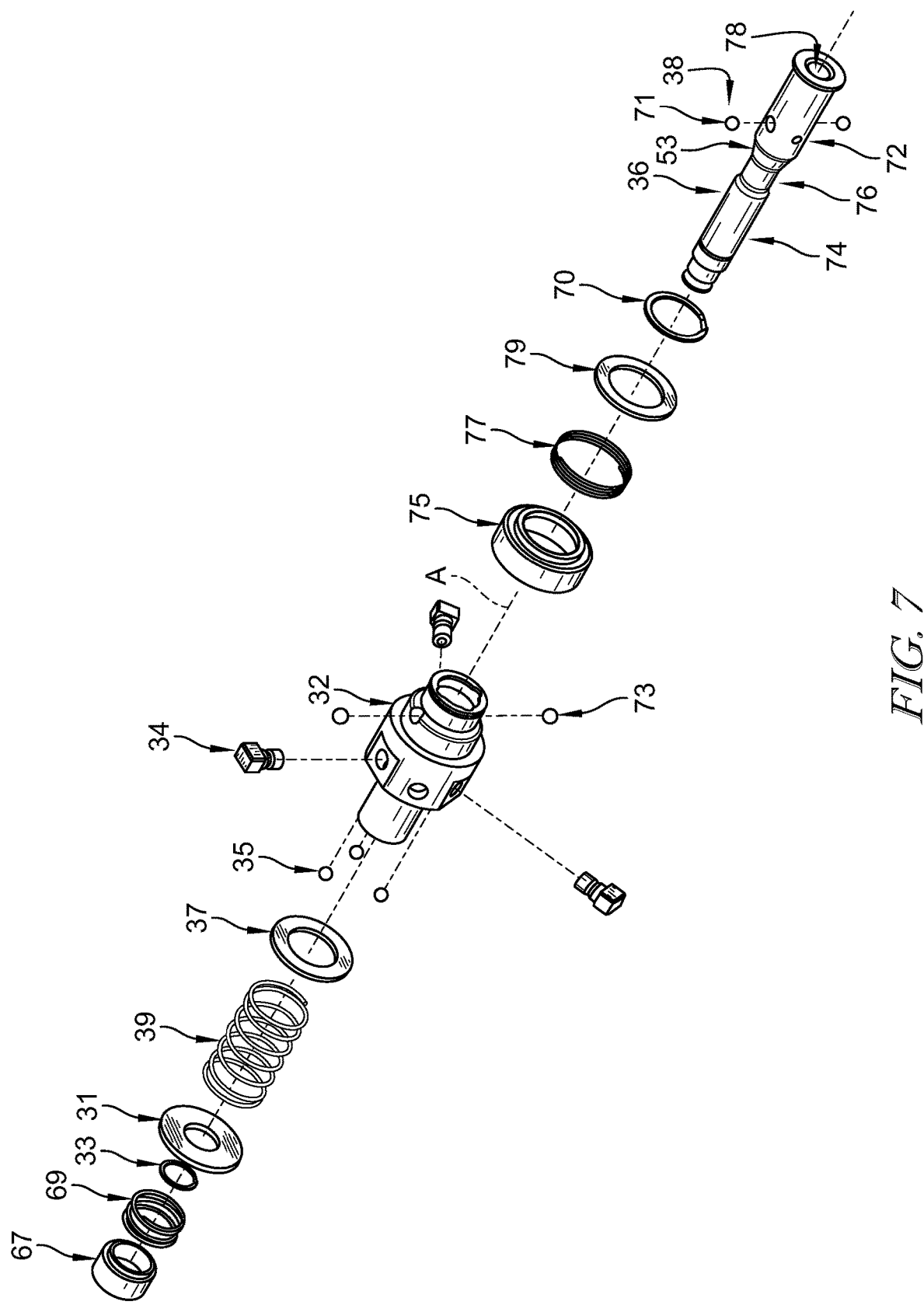
FIG. 7 is an exploded assembly view of the locking mechanism of FIG. 5 showing that the plunger is received in a cartridge body to engage with the lock pins to bias the lock pins outward toward the engagement position.

Plunger-motion controller 38 includes one or more plunger ball bearings 71 (two are shown in FIGS. 6 and 7) positioned for movement with plunger 36 and one or more cartridge ball bearings 73 coupled to cartridge body 32 by a collar 75 as suggested in FIGS. 6 and 7. A spring 77 extends between collar 75 and a washer 79 coupled to cartridge body 32 by a lock ring 70 to bias collar 75 toward lock pins 34 and trap cartridge ball bearings 73 relative to plunger 36 and cartridge body 32. Plunger ball bearings 71 extend into holes formed through a leading end 72 of plunger 36 and into a cavity 78 extending through plunger 36. An annular groove 76 separates leading end 72 from trailing end 74 and defining a ramp 53 adjacent to leading end 72 for driving lock pins 34 outward as plunger 36 moves to the hold position. Plunger ball bearings 71 ride along control shaft 18 with movement of inner tube 12 relative to outer tube 14.

Figure 8:
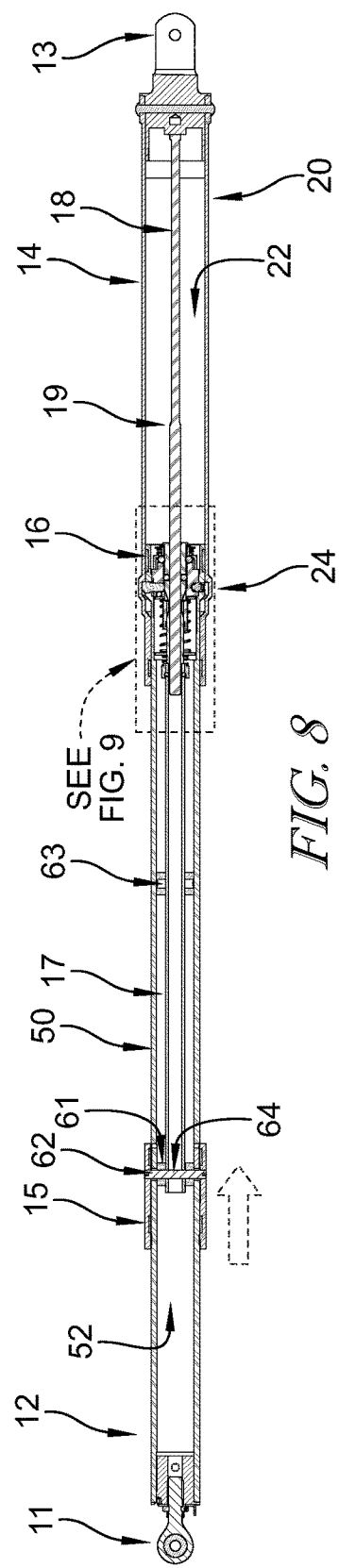
FIG. 8 is a sectional view taken along line 8-8 in FIG. 2A showing the hold open rod assembly in the fully extended and locked position and suggesting that movement of the lock-release sleeve toward the locking mechanism forces movement of the plunger relative to the cartridge body as part of an unlocking process in accordance with the present disclosure.
Figure 9:
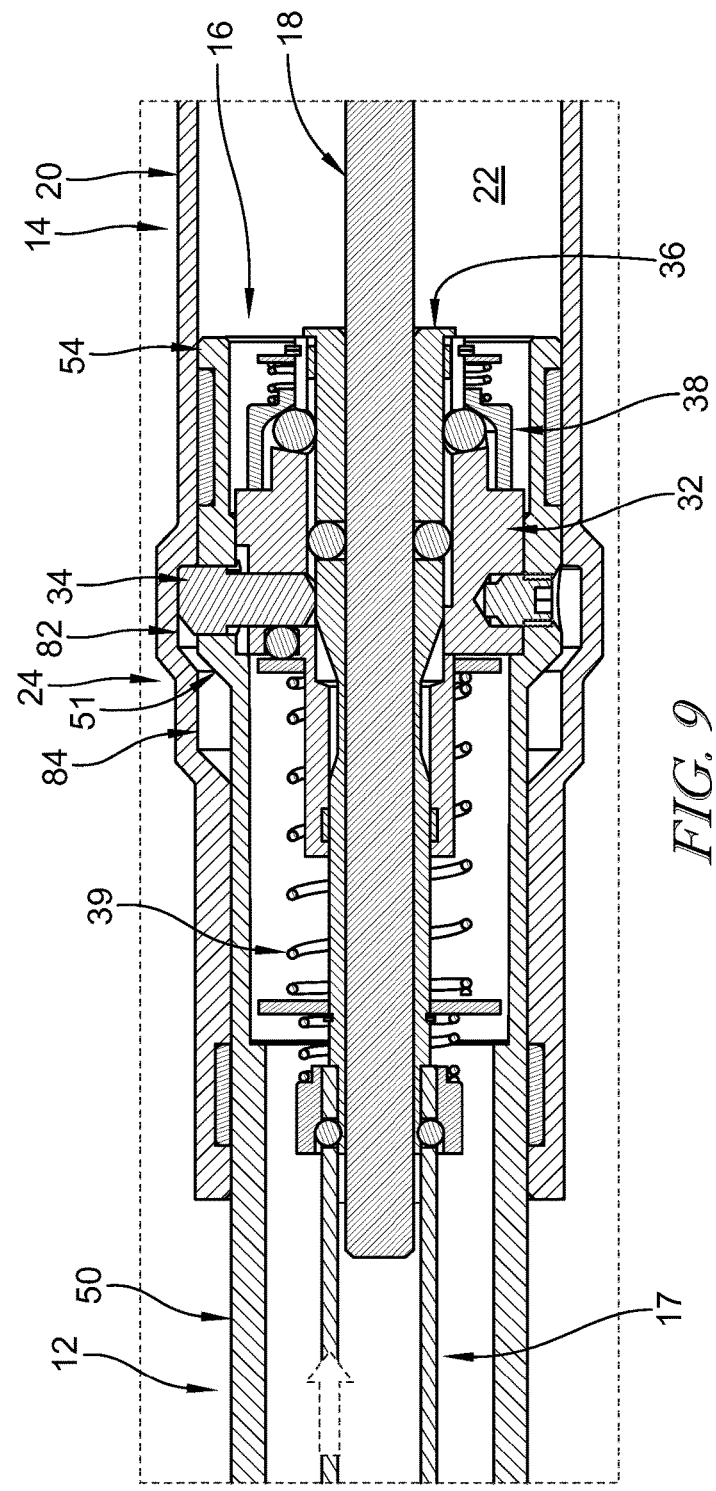
FIG. 9 is an enlarged view of FIG. 8 showing the plunger in the hold position engaged with the lock pins to block inward movement of the lock pins and suggesting that the plunger is moved to align an annular groove of the plunger with the lock pins to allow inward movement of the lock pins as part of the unlocking process as illustrated in FIGS. 10-15.
Figure 10:
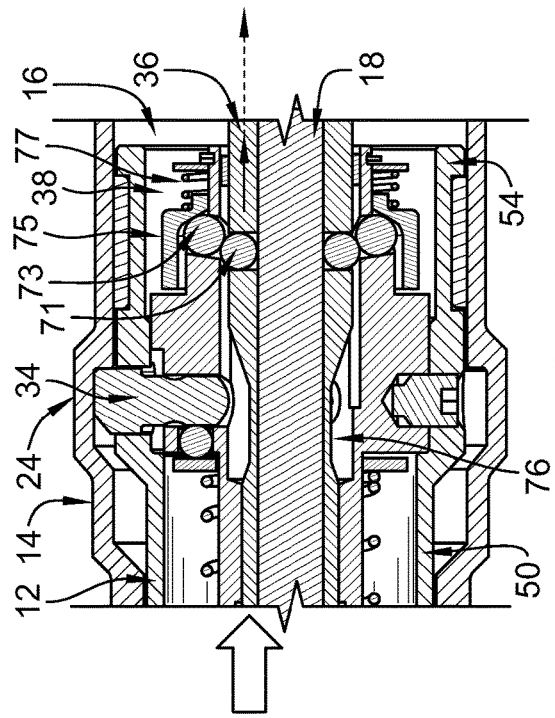
FIGS. 10-13 are views similar to FIG. 9 illustrating movement of the plunger relative to the cartridge body to align the annular groove of the plunger with the lock pins and activate the plunger-motion controller as part of the unlocking process.
Figure 12:
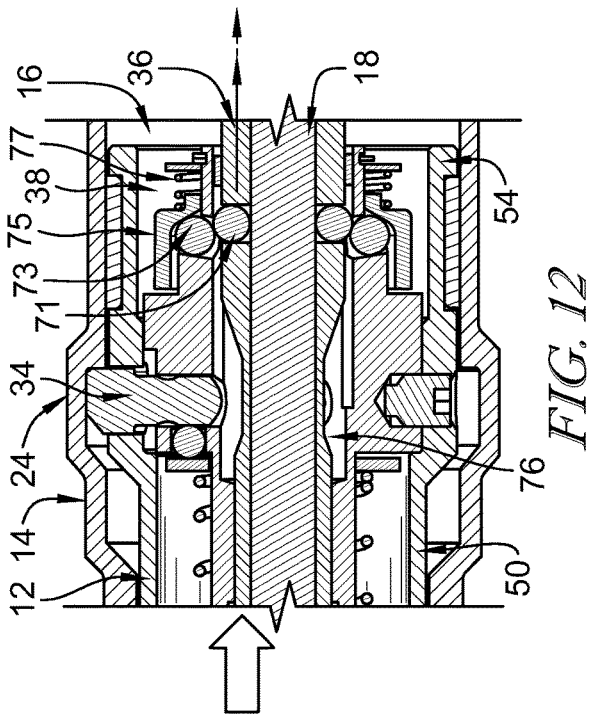
Figure 11:
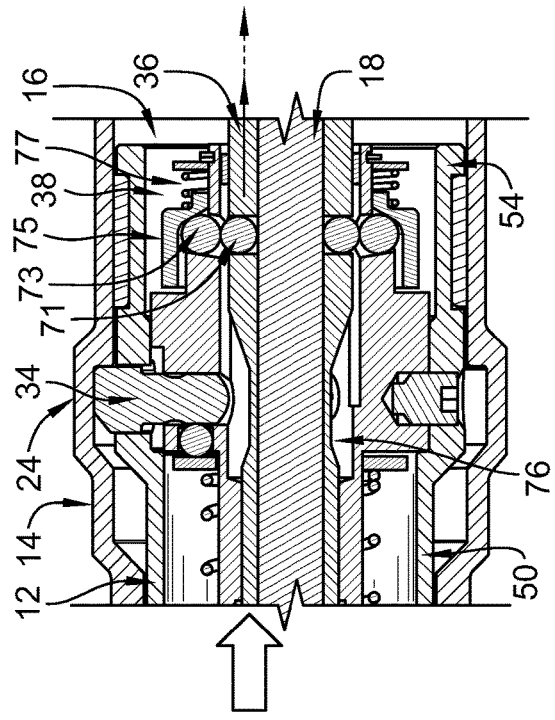

Hold open rod assembly 10 is shown in a fully extended and locked position with locking mechanism 16 engaged with catch 24 in FIG. 8. Catch 24 includes a pair of annular grooves 82, 84 with groove 84 positioned radially inward of groove 82 as shown in FIG. 9. Lock pins 34 extend into groove 82 in the engagement position and plunger 36 blocks inward movement of lock pins 34 in the hold position to trap lock pins 34 in groove 82. Further extension of hold open rod assembly 10, such as through unintentional movement of panels 103, 105, engages lock pins 34 with groove 82 to block movement of inner tube 12 relative to outer tube 14 while hold open rod assembly 10 is in the locked state. For example, a gust of wind may bias panels 103, 105 toward a position beyond the open position, but panels 103, 105 remain in the open position due to the locking mechanism 16.

Movement of lock-release sleeve 15 causes movement of plunger 36 from the hold position to the release position as suggested in FIGS. 8-13. Plunger ball bearing 71 forces cartridge ball bearing 73 outward against collar 75 and the bias of spring 77 and passes under cartridge ball bearing 73 as plunger 36 moves toward the release position as suggested in FIGS. 10-13. Spring 77 and collar 75 force cartridge ball bearing 73 inward as plunger 36 reaches the release position.

Figure 13:
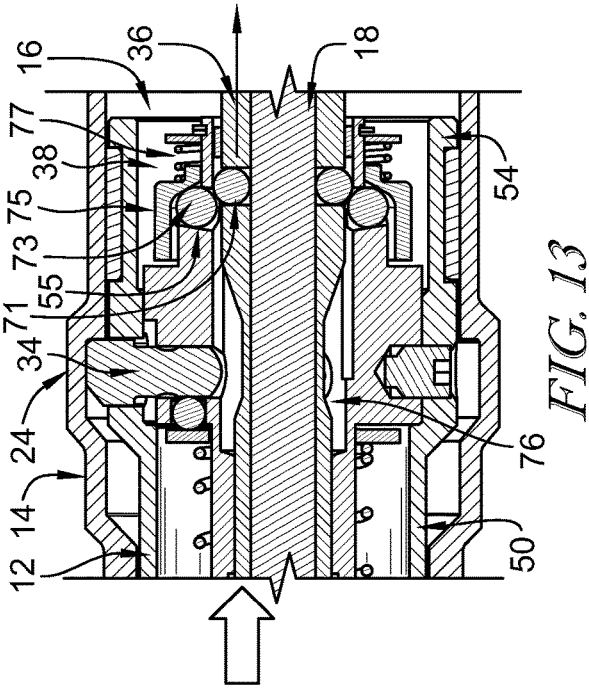

Locking mechanism 16 is in the unloaded configuration where plunger 36 is blocked from movement toward the hold position by plunger-motion controller 38 as shown in FIG. 13. A sloped profile 55 of the hole in cartridge body 32 that receives cartridge ball bearing 73 allows outward movement of cartridge ball bearing 73 as plunger 36 moves toward the release position and blocks outward movement of cartridge ball bearing 73 in a reverse direction of plunger 36 toward the hold position. Initially in the unloaded configuration, lock pins 34 are still in the engagement position and engaged with groove 82 to block movement of inner tube 12 relative to outer tube 14 toward the retracted position as suggested in FIG. 13. As such, hold open rod assembly 10 supports panels 103, 105 in the open position while in the unloaded configuration to allow a user to prepare the panels 103, 105 for movement to the closed position without the user having to hold panels 103, 105 in the open position themselves. In some embodiments, an indicia of unlocked status of hold open rod assembly 10 is exposed to indicate to a user that hold open rod assembly 10 is in an unlocked state.

In one illustrative process for unlocking hold open rod assembly 10, locking mechanism 16 is moved to the unloaded configuration as described above in relation to FIGS. 8-13. A user extends hold open rod assembly 10, such as by moving panels 103, 105 away from the closed position, to move inner tube 12 relative to outer tube 14 and drive lock pins 34 radially inward to the travel position as suggested in FIG. 14. Beveled surfaces of lock pin 34 and groove 82 engage with one another to force lock pins 34 inward as hold open rod assembly 10 is extended. A shoulder 51 of receiver 54 on inner tube 12 engages with groove 84 to block inner tube 12 from passing through outer tube 14. Ball bearings 35 engage with lock pins 34 to hold lock pins 34 in the travel position and allow hold open rod assembly 10 to move to the retracted position as suggested in FIG. 15.

Figure 16:
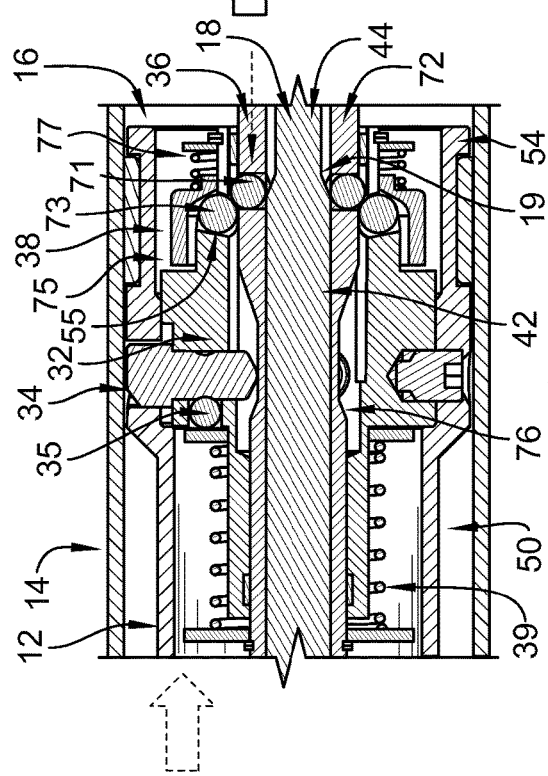
FIGS. 16-19 are views similar to FIGS. 14-15 illustrating movement of the locking mechanism relative to the control shaft as part of a lock reset process in accordance with the present disclosure to place the locking mechanism in the loaded configuration and allow movement of the plunger relative to the cartridge body to bias the lock pins toward the engagement position for locking the hold open rod assembly in the fully extended position at the selection of a user.
Figure 18:
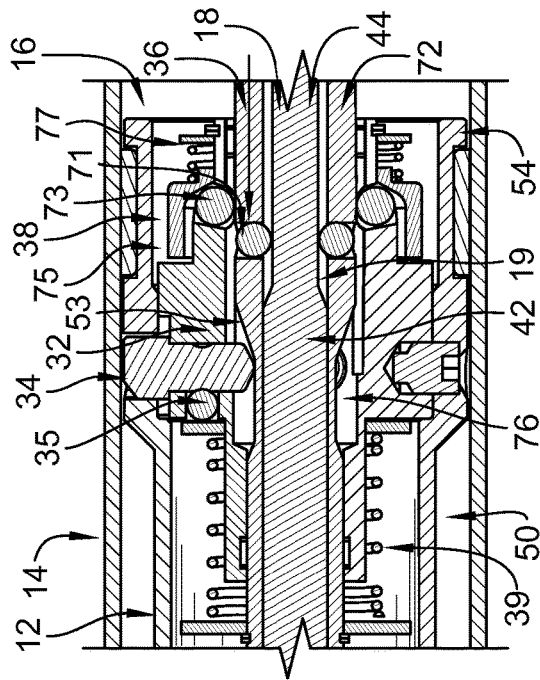
Figure 17:
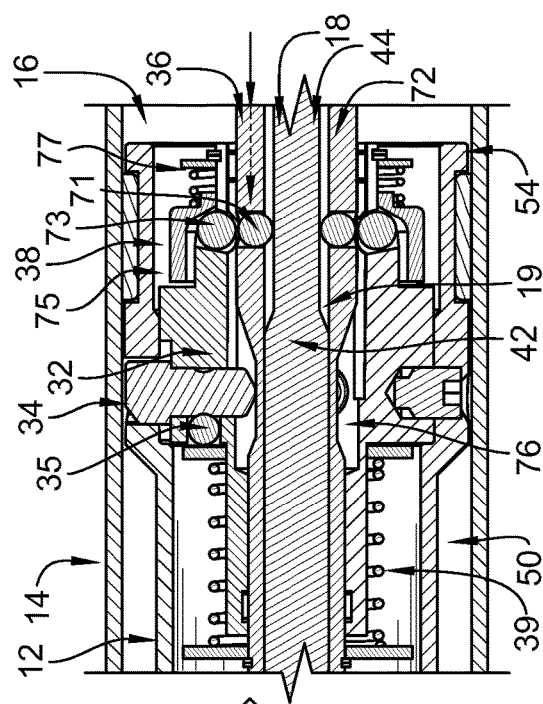
Figure 19:
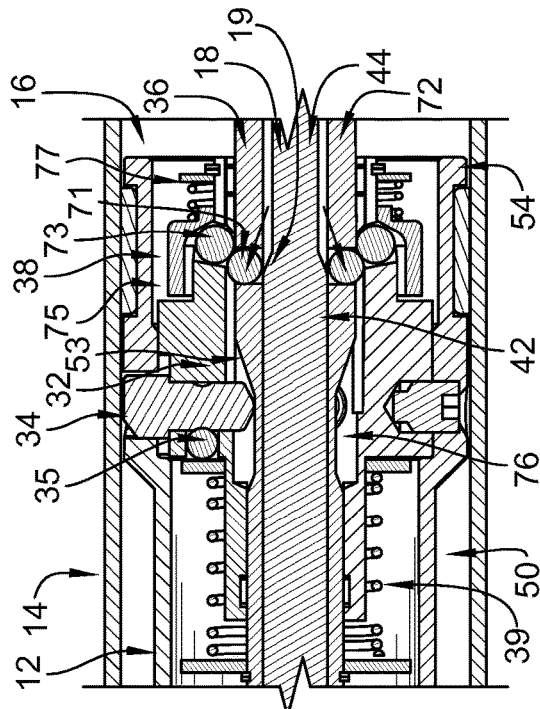

In one illustrative process for resetting locking mechanism 16, plunger ball bearings 71 ride along section 42 of control shaft 18 as hold open rod assembly 10 moves toward the retracted position as suggested in FIG. 16. Further movement toward the retracted position moves plunger ball bearings 71 over reset point 19 onto section 44 of control shaft 18 as suggested in FIG. 17. Section 44 is sized to allow plunger ball bearings 71 to pass around cartridge ball bearings 73 as main spring 39 biases plunger 36 toward the hold position to place locking mechanism 16 in the loaded configuration as suggested in FIGS. 17 and 18. Plunger ball bearings 71 ride up the transition from section 44 to section 42 as hold open rod assembly 10 is extended to allow plunger-motion controller 38 to again control motion of plunger 36 as suggested in FIG. 19.

In illustrative embodiments, hold open rod assembly 10 reaches a fully extended position when panels 103, 105 reach the open position as suggested in FIG. 1B. In the fully extended position, lock pins 34 align with annular groove 82 of outer tube 14 and are forced into groove 82 by plunger 36 as suggested in FIGS. 8 and 9. Lock pins 34 engage with groove 82 to block inner tube 12 from moving back into outer tube 14 and places hold open rod assembly 10 in a locked state to support panels 103, 105 in the open position.

In illustrative embodiments, hold open rod assembly 10 provides for regulated movement of right-side and left-side panels 103, 105 of a fan cowl. In some embodiments, hold open rod assembly 10 is used on other areas of an aircraft where a panel is to be held in an open position. In some embodiments, hold open rod assembly 10 is used on other land, water, or air bases vehicles. Hold open rod assembly 10 is illustratively formed from rigid materials, such as metal, metal alloys, or plastic for example. In some embodiments, an aluminum alloy and/or stainless steel are used to form some or all of hold open rod assembly 10.

In illustrative embodiments, a hold open rod assembly 10 includes a telescoping inner tube 12, outer tube 14, with a fixed end 13 attached to outer tube 14 and a pivotable end 11 attached to inner tube 12. Inner tube 12 telescopes axially along a central axis A extending along both inner tube 12 and outer tube 14.

In illustrative embodiments, a lock-release sleeve 15 is shiftable on inner tube 12 to initiate the unlocking process. When the sleeve 15 is shifted along the outer surface of inner tube 12, towards fixed end 13, an indicia in the form of a colored stripe indicates that sleeve 15 has been shifted to the unlocked position.

In illustrative embodiments, a locking mechanism 16 is attached to a connecting pole 17 axially aligned within the inner tube 12. As indicated, the locking mechanism 16 (sometimes called a cartridge assembly) is attached to a receiver 54 of the inner tube 12. A control shaft 18 is provided axially aligned with the overall hold open rod assembly 10. The locking mechanism 16 includes a series of pins 34 that axially insert into passages formed in a cartridge body 32.

In illustrative embodiments, the control shaft 18 has a portion axially retained within the cavity defined by the outer tube 14 with a mounting end attached to the fixed end 13 of the control shaft 18. The fixed end 13 is attached to the distal end of the outer tube 14. The control shaft 18 is fixed by bonding, threading, or other means mechanical, chemical, welding, or otherwise to attach to the fixed end 13. This provides a secure non-movable attachment point for the control shaft 18 and defines a reduced diameter portion or necked portion defining a reset point 19 along a predetermined length of the overall control shaft 18. As noted, the necked portion 19 of the control shaft 18 can be positioned at any location along the length of the control shaft 18 that provides interaction for the reset function. As such, depending on the application of the overall control shaft assembly to other structures, it may be desirable to position this necked portion, providing a defined control feature position, at a variety of locations along the control shaft. In other words, for a particular control shaft application, the necked portion 19 can be positioned closer to or away from the fixed end 13. This allows for a reset when the inner tube 12 is telescoped internally within the outer tube 14 at a position closer to or spaced away from the fixed end 13. This is in contrast to some other structures in which the inner tube 12 must generally be advanced telescopically along the axis A towards the fixed end 13 regardless of the application of the hold open rod assembly 10.

In illustrative embodiments, movement of the sleeve 15 causes shifting of the plunger 36 causing the smaller balls 71 to move past the larger balls 73 against the force of the spring biasing assembly including the spring 77. As the smaller ball 71 is urged against the larger ball 73, the larger ball 73 shifts upwardly into a diagonal passage against the spring force urging it axially inwardly through the same passage. The spring force of the spring 77 against the collar 75 urges the ball 73 downwardly through the passage. The plunger 36 is advanced to a release position that will allow the pins 34 to move radially inwardly by movement of the outer tube 14 away from the inner tube 12 to cause the beveled edges of the pins 34 to ride against the corresponding beveled features of the annular groove 82, respectively, formed in the wall of the outer tube 14.

In illustrative embodiments, the operation of the locking and unlocking features allows the hold open rod assembly 10 to be unlocked while retaining the load of the assembly in a working condition. Once unlocked, the pins 34 can be disengaged to allow passage of the inner tube 12 carrying the locking mechanism 16 inwardly, axially through the outer tube 14. It should be noted that the spring 39 provides a spring biasing force on a washer 37 against a ball 35 to releasably engage a corresponding recess on the pin 34. This allows the pins 34 to be retained inwardly, radially within the cartridge body 32 for movement along the path within the outer tube 14.

In illustrative embodiments, a reset function of the locking mechanism 16 is carried out by interaction with control shaft 18 to allow reset at a predetermined position along the telescoping of the assembly 10. The present configuration of structures in this assembly does not require bottoming out in order to reset, though this can be one of the predetermined locations for reset if desired. However, other designs may require collapsing or telescoping the tubes to their full minimum in order to bottom out the structures and cause a reset action of the locking features thereof.

In illustrative embodiments, the control shaft 18 includes a necked portion 19 that is a reduced diameter. This reduced diameter feature can be positioned along the control shaft 18 at any position which provides a desirable result for the particular hold open rod assembly within its particular design parameters and operating conditions. This allows the manufacturer to design and produce a hold open rod assembly that can either operate for specific applications or a range of applications.

In illustrative embodiments, reset occurs when the inner tube 12 is axially retracted into the outer tube 14 to position the locking mechanism 16 relative to control shaft 18 such that the smaller balls 71 carried in the plunger 36 can ride past the larger balls 73 also carried on the locking mechanism 16 but in the cartridge body 32 to reset the locking mechanism 16 for the next use. The control shaft 18 is urged axially through the plunger 36 to a position where the necked feature 19 is positioned relative to the smaller balls 71 that are allowed to drop through their corresponding passage in the space provided by the reduced diameter portion 19 of the control shaft 18. The plunger 36 to move relative to the cartridge body 32 the smaller balls 71 are carried with the plunger 36 in their passages and allowed to pass beyond the spring loaded larger balls 73. Once the smaller balls 71 are positioned between the larger balls 73 and the pins 34 the assembly is at the reset condition.

In illustrative embodiments, a hold open rod assembly which includes at least an outer tubular structure and an inner tubular structure with a locking mechanism carried on the inner tubular structure and interacting with the outer tubular structure to retain the hold open rod assembly in an variety of conditions or states. In one state the tubes are telescopically retracted while in another position the tubes are telescopically extended. The locking mechanism includes structures that facilitate unlocking to retract the inner tube telescopically into the outer tube. The mechanisms also facilitate engagement of lock pins carried on the locking mechanism to engage an inner surface of the outer tube in an extended position. An outer sleeve is attached to the portions of the locking mechanism and is operable relative a portion of the locking mechanism to unlock the mechanism to collapse the rod assembly. Further, the outer sleeve is used to facilitate a "flag" condition which indicates that the locking mechanism is either "locked" or "unlocked" based on the position of the outer sleeve which is also used to achieve the desired condition.

In illustrative embodiments, a hold open rod assembly (sometimes called a strut) is provided which allows for single person operation by sustaining a load while in an intermediate unlocked position. A locking mechanism is mounted inside the strut and allows the strut to be placed in an intermediate unlocked state while sustaining a compression load. The locking mechanism self-resets during retraction of the strut.

In illustrative embodiments, the hold open rod assembly is a metallic tubular design formed from an aluminum alloy and/or stainless steel. The hold open rod assembly includes a sleeve for unlocking the hold open rod assembly even while hold open rod assembly is under compression. The strut is able to support the compressive load even with the sleeve unlocked.

In illustrative embodiments, a user or operator would then lift the fan cowl supported by the strut to fully extend the strut and disengage the locking mechanism. Once the locking mechanism is disengaged, the user is able to close the fan cowl and reset the locking mechanism to an "armed" condition such that it will re-lock once the fan cowl is re-opened. A rubber snubber may be used to laterally pre-load the strut when stowed.

In illustrative embodiments, the strut is movable between a retracted position, an extended position, and a vibe position between the retracted and extended positions. The locking mechanism is fitted on the inner tube as well as an unlocking sleeve. The unlock sleeve can be pulled straight along the inner tube. A flagging system is included to indicate a locked or unlocked condition of the strut to an operator.

In illustrative embodiments, the locking mechanism includes three lock pins that extend outward to lock into a groove formed in the outer tube. The motion of the lock pins is provided by a compression spring acting on a plunger engaged with the lock pins. The unlocking sleeve is engaged with the locking mechanism. A cartridge assembly of the locking mechanism locks the strut once extended and allows the strut to sustain compression and tension loads.

In illustrative embodiments, the plunger is pushed toward the lock pins by the compression spring to pre-load the lock pins outward. Once the lock pins reach a groove in the outer tube the plunger drives the lock pins outward to extend into the groove. The unlocking sleeve is connected to the plunger and moves therewith. Compression and tension forces are transferred across surfaces of the lock pins and groove of the outer tube. A green stripe uncovered by the unlocking sleeve indicates the strut is in a locked condition.

In illustrative embodiments, the unlocking sleeve is pulled to uncover a red stripe indicating the strut is in an unlocked condition. The unlocking sleeve pulls the plunger axially and is kept in place by an inner ball lock mechanism. The lock pins are kept in place by compression loads on the strut and frictional forces with a ball detent assembly.

In illustrative embodiments, the operator lifts the fan cowl to the fully opened position which extends the strut to drive the lock pins inward. The ball detent assembly retains the pin in place so the strut can be retracted. A plunger-motion controller interacts with a control shaft as the strut is retracted to reset the locking mechanism. The plunger retracts and is re-armed.

In illustrative embodiments, a telescoping hold open rod is controllably lockable and unlockable for use in holding a panel open to provide a user access to an opening covered by the panel. The hold open rod is useful in allowing the rod to be unlocked and retracted when subject to a compressive load. The rod can be locked into an extended position to maintain the panel in an open position relative to the opening to facilitate access to the opening without the rod telescoping closed. A retention assembly includes structures and biasing devices to maintain the rod in an open condition although subject to compressive loads.

The following numbered clauses include embodiments that are contemplated and non-limiting:

Clause 1. A hold open rod assembly comprising,
an outer tube,
an inner tube slidably movable relative to the outer tube, and
a locking mechanism.

Clause 2. The hold open rod assembly of clause 1, any other clause, or any combination of clauses, wherein the inner tube extends into the outer tube and is configured to slide relative to the outer tube between a fully retracted position where the inner tube is substantially received in the outer tube and a fully extended position where the inner tube is extended away from the outer tube.

Clause 3. The hold open rod assembly of clause 2, any other clause, or any combination of clauses, wherein the locking mechanism is positioned within the outer tube and coupled to the inner tube to move with the inner tube.

Clause 4. The hold open rod assembly of clause 3, any other clause, or any combination of clauses, wherein the locking mechanism includes one or more lock pins and a plunger positioned to engage with the lock pins.

Clause 5. The hold open rod assembly of clause 4, any other clause, or any combination of clauses, wherein the locking mechanism is configured to block movement of the inner tube relative to the outer tube at the selection of a user.

Clause 6. The hold open rod assembly of clause 5, any other clause, or any combination of clauses, further comprising a control shaft coupled to the outer tube.

Clause 7. The hold open rod assembly of clause 6, any other clause, or any combination of clauses, wherein the locking mechanism is configured for movement between a loaded configuration biasing the lock pins outward to engage the lock pins with the outer tube to block movement of the inner tube relative to the outer tube when the inner tube reaches the fully extended position and an unloaded configuration where the lock pins are allowed to move inward to allow movement of the inner tube relative to the outer tube.

Clause 8. The hold open rod assembly of clause 7, any other clause, or any combination of clauses, wherein the control shaft engages with the locking mechanism and defines a reset point at a predetermined location along a length of travel of the inner tube relative to the outer tube to allow movement of the locking mechanism from the unloaded configuration to the loaded configuration.

Clause 9. The hold open rod assembly of clause 8, any other clause, or any combination of clauses, wherein the plunger and the lock pins are at least partially received in a cartridge body.

Clause 10. The hold open rod assembly of clause 9, any other clause, or any combination of clauses, wherein the lock pins extend into the cartridge body in a radial direction and the plunger extends into the cartridge body in an axial direction.

Clause 11. The hold open rod assembly of clause 10, any other clause, or any combination of clauses, wherein the lock pins are slidable relative to the cartridge body along the radial direction between an engagement position and a travel position.

Clause 12. The hold open rod assembly of clause 11, any other clause, or any combination of clauses, wherein the plunger is slidable relative to the cartridge body along the axial direction between a hold position arranged to block movement of the lock pins from the engagement position to the travel position and a release position.

Clause 13. The hold open rod assembly of clause 12, any other clause, or any combination of clauses, wherein the outer tube includes a catch and wherein the plunger forces the lock pins into the catch of the outer tube when the inner tube reaches the fully extended position and the lock pins are aligned with the catch.

Clause 14. The hold open rod assembly of clause 13, any other clause, or any combination of clauses, wherein the plunger is formed to include a ramp configured to engage with the lock pins to bias the lock pins radially outward toward the engagement position for engaging the outer tube.

Clause 15. The hold open rod assembly of clause 13, any other clause, or any combination of clauses, further comprising a lock-release sleeve coupled to the plunger and configured to move the plunger relative to the cartridge body at the selection of a user to allow the lock pins to be removed from the catch of the outer tube and allow movement of the inner tube relative to the outer tube.

Clause 16. The hold open rod assembly of clause 15, any other clause, or any combination of clauses, wherein the inner tube defines a receiver configured to receive the cartridge body therein.

Clause 17. The hold open rod assembly of clause 16, any other clause, or any combination of clauses, wherein the lock pins extend through the receiver to engage with the outer tube.

Clause 18. The hold open rod assembly of clause 17, any other clause, or any combination of clauses, further comprising a spring coupled between the cartridge body and the plunger and configured to bias the plunger along the axial direction toward the hold position.

Clause 19. The hold open rod assembly of clause 18, any other clause, or any combination of clauses, wherein the locking mechanism further includes a plunger-motion controller engaged with the cartridge body and the plunger and configured to control motion of the plunger relative to the cartridge body.

Clause 20. The hold open rod assembly of clause 19, any other clause, or any combination of clauses, wherein the plunger-motion controller includes one or more cartridge ball bearings received in the cartridge body, one or more plunger ball bearings received in the plunger, and a collar for trapping the cartridge ball bearings relative to the plunger and cartridge body, and wherein the plunger ball bearings ride along the control shaft with movement of the inner tube relative to the outer tube.

Clause 12. A method of operating a hold open rod assembly comprising,
sliding an inner tube relative to an outer tube toward a fully extended position away from a collapsed position,
engaging lock pins of a locking mechanism with the outer tube to place the hold open rod assembly in a locked state,
sliding a lock-release sleeve relative to the inner tube to slide a plunger of the locking mechanism relative to the lock pins from a hold position to a release position to disengage the plunger from the lock pins and place the hold open rod assembly in an unloaded configuration,
sliding the inner tube relative to an outer tube away from the collapsed position to disengage the lock pins from the outer tube to place the hold open rod assembly in an unlocked state and allow the inner tube to slide relative to the outer tube toward a fully retracted position, and
resetting the locking mechanism by sliding the inner tube relative to the outer tube toward the collapsed position and passing a plunger-motion controller over a reset point on a control shaft coupled to the outer tube to allow the plunger to move toward the hold position and bias the lock pins outward.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure.

What is claimed is:

1. A hold open rod assembly comprising:
   an outer tube formed to define a catch,
   an inner tube extending into the outer tube and configured to slide relative to the outer tube between a retracted position, in which the inner tube is substantially received in the outer tube, and an extended position, in which the inner tube is extended away from the outer tube,
   a locking mechanism positioned within the outer tube and coupled to the inner tube to move with the inner tube, the locking mechanism including one or more lock pins and a plunger positioned to engage with the one or more lock pins,
   a lock-release sleeve coupled to the plunger and configured to move the plunger relative to a cartridge body at the selection of a user to allow the one or more lock pins to be removed from the catch of the outer tube and allow movement of the inner tube relative to the outer tube, and
   a control shaft movable within the plunger coupled to the outer tube and arranged for engagement with at least one of the lock pins of the locking mechanism,
   wherein the locking mechanism is configured for movement between:
   a locked state, in which the one or more lock pins extend into the catch of the outer tube for engagement with the outer tube in response to the inner tube sliding to the extended position to block sliding of the inner tube relative to the outer tube toward the retracted position and in which the plunger blocks movement of the one or more lock pins out of the catch and away from the outer tube,
   an intermediate unlocked state, in which the plunger is disengaged from the one or more lock pins to allow movement of the one or more lock pins away from the outer tube and in which the one or more lock pins remain in the catch for engagement with the outer tube to block sliding of the inner tube relative to the outer tube toward the retracted position,
   a unlocked state, in which the one or more lock pins move away from the outer tube toward the plunger and out of the catch in response to sliding of the inner tube away from the retracted position such that the one or more lock pins are positioned to allow sliding of the inner tube toward the retracted position, and
   an armed state, in which the plunger is biased toward the one or more lock pins and engages with the one or more lock pins to bias the one or more lock pins toward the outer tube in response to the inner tube sliding toward the retracted position and moving the locking mechanism across a reset point defined by the control shaft at a predetermined location along a length of travel of the inner tube relative to the outer tube to allow movement of the locking mechanism from the unlocked state to the armed state.

2. The hold open rod assembly of claim 1, wherein the one or more lock pins extend into a cartridge body in a radial direction and the plunger extends into the cartridge body in an axial direction, wherein the one or more lock pins are slidable relative to the cartridge body along the radial direction between an engagement position and a travel position, and wherein the plunger is slidable relative to the cartridge body along the axial direction between a hold position arranged to block movement of the one or more lock pins from the engagement position to the travel position and a release position.

3. The hold open rod assembly of claim 2, wherein the plunger forces the one or more lock pins into the catch of the outer tube in response to the inner tube reaching the extended position and the one or more lock pins aligning with the catch.

4. The hold open rod assembly of claim 3, wherein the plunger is formed to include a ramp configured to engage with the one or more lock pins to bias the one or more lock pins radially outward toward the engagement position for engaging the outer tube.

5. The hold open rod assembly of claim 3, further comprising a lock-release sleeve coupled to the plunger and configured to move the plunger relative to the cartridge body at the selection of a user to allow the one or more lock pins to be removed from the catch of the outer tube and allow movement of the inner tube relative to the outer tube.

6. The hold open rod assembly of claim 5, wherein the inner tube defines a receiver configured to receive the cartridge body therein, and wherein the one or more lock pins extend through the receiver to engage with the outer tube.

7. The hold open rod assembly of claim 6, further comprising a spring coupled between the cartridge body and the plunger and configured to bias the plunger along the axial direction toward the hold position.

8. The hold open rod assembly of claim 7, wherein the locking mechanism further includes a plunger-motion controller engaged with the cartridge body and the plunger and configured to control motion of the plunger relative to the cartridge body.

9. The hold open rod assembly of claim 8, wherein the plunger-motion controller includes one or more cartridge ball bearings received in the cartridge body, one or more plunger ball bearings received in the plunger, and a collar for trapping the one or more cartridge ball bearings relative to the plunger and cartridge body, and wherein the one or more plunger ball bearings ride along the control shaft with movement of the inner tube relative to the outer tube.

10. A method of operating a hold open rod assembly, wherein the hold open rod assembly includes an inner tube, an outer tube, a locking mechanism positioned within the outer tube and coupled to the inner tube to move the inner tube, the locking mechanism including one or more lock pins and a plunger positioned to engage with the one or more lock pins, a control shaft coupled to the outer tube and arranged for engagement with the locking mechanism, and a lock-release sleeve coupled to the plunger and configured to move the plunger relative to a cartridge body at the selection of a user to allow the one or more lock pins to be removed from the catch of the outer tube and allow movement of the inner tube relative to the outer tube, and a control shaft movable within the plunger coupled to the outer tube and arranged for engagement with at least one of the lock pins of the locking mechanism, the plunger and configured to move the plunger relative to a cartridge body at the selection of a user to allow the one or more lock pins to be removed from the catch of the outer tube and allow movement of the inner tube relative to the outer tube, and a control shaft movable within the plunger coupled to the outer tube and arranged for engagement with at least one of the lock pins of the locking mechanism, the method comprising:
sliding the inner tube relative to the outer tube toward an extended position away from a retracted position,
moving one or more lock pins of the locking mechanism into a catch of the outer tube for engagement with the outer tube to place the hold open rod assembly in a locked state, in which sliding of the inner tube from the extended position toward a collapsed position is blocked and in which a plunger of the locking mechanism is engaged with the one or more lock pins so as to block movement of the one or more lock pins out of the catch and away from the outer tube,
sliding the lock-release sleeve relative to the inner tube to slide the plunger of the locking mechanism relative to the one or more lock pins from a hold position to a release position to disengage the plunger from the one or more lock pins and place the hold open rod assembly in an intermediate unlocked state, in which the one or more lock pins remain in the catch for engagement with the outer tube to block sliding of the inner tube from the extended position toward the retracted position,
sliding the inner tube relative to an outer tube away from the retracted position to move the one or more lock pins out of the catch to place the hold open rod assembly in an unlocked state, in which the one or more lock pins are positioned to allow the inner tube to slide relative to the outer tube toward the retracted position, and
sliding the inner tube relative to the outer tube toward the retracted position and passing a plunger-motion controller across a reset point defined by the control shaft to allow the plunger to move toward the hold position and bias the one or more lock pins toward the outer tube.

11. The method of claim 10, wherein the one or more lock pins extend into a cartridge body in a radial direction and the plunger extends into the cartridge body in an axial direction, wherein the one or more lock pins are slidable relative to the cartridge body along the radial direction between an engagement position and a travel position, and wherein the plunger is slidable relative to the cartridge body along the axial direction between a hold position arranged to block movement of the one or more lock pins from the engagement position to the travel position and a release position.

12. The method of claim 11, wherein the plunger forces the one or more lock pins into the catch of the outer tube in response to the inner tube reaching the extended position and the one or more lock pins aligning with the catch.

13. The method of claim 12, wherein the plunger is formed to include a ramp configured to engage with the one or more lock pins to bias the one or more lock pins radially outward toward the engagement position for engaging the outer tube.

14. The method of claim 12, wherein the inner tube defines a receiver configured to receive the cartridge body therein, and wherein the one or more lock pins extend through the receiver to engage with the outer tube.

15. The method of claim 14, further comprising a spring coupled between the cartridge body and the plunger and configured to bias the plunger along the axial direction toward the hold position.

16. The method of claim 15, wherein the locking mechanism further includes a plunger-motion controller engaged with the cartridge body and the plunger and configured to control motion of the plunger relative to the cartridge body.

17. The method of claim 16, wherein the plunger-motion controller includes one or more cartridge ball bearings received in the cartridge body, one or more plunger ball bearings received in the plunger, and a collar for trapping the one or more cartridge ball bearings relative to the plunger and cartridge body, and wherein the one or more plunger ball bearings ride along the control shaft with movement of the inner tube relative to the outer tube.

18. The method of claim 17, wherein the control shaft includes a first section and a second section, wherein the second section has a smaller diameter than the first section, and wherein the reset point is arranged between the first and second sections.

19. The method of claim 18, wherein the one or more plunger ball bearings engage with the first section of the control shaft in the extended position, and wherein the one or more plunger ball bearings engage with the second section of the control shaft in response to the one or more plunger ball bearings passing the rest point with movement of the inner tube toward the retracted position such that the one or more plunger ball bearings are positioned radially inward compared to the one or more cartridge ball bearings to allow the plunger to move toward the one or more lock pins and transition the locking mechanism to the armed state.

20. The hold open rod assembly of claim 9, wherein the control shaft includes a first section and a second section, wherein the second section has a smaller diameter than the first section, and wherein the reset point is arranged between the first and second sections.

21. The hold open rod assembly of claim 20, wherein the one or more plunger ball bearings engage with the first section of the control shaft in the extended position, and wherein the one or more plunger ball bearings engage with the second section of the control shaft in response to the one or more plunger ball bearings passing the rest point with movement of the inner tube toward the retracted position such that the one or more plunger ball bearings are positioned radially inward compared to the one or more cartridge ball bearings to allow the plunger to move toward the one or more lock pins and transition the locking mechanism to the armed state.

\* \* \* \* \*